(12) United States Patent
Billod

(10) Patent No.: US 8,755,159 B2
(45) Date of Patent: Jun. 17, 2014

(54) SYSTEM OF CURRENT PROTECTION OF A PRIMARY ELECTRICAL DISTRIBUTION BOX

(75) Inventor: Henri Billod, Othis (FR)

(73) Assignee: ECE, Paris (FR)

( * ) Notice: Subject to any disclaimer, the term of this patent is extended or adjusted under 35 U.S.C. 154(b) by 8 days.

(21) Appl. No.: 13/490,944

(22) Filed: Jun. 7, 2012

(65) Prior Publication Data

US 2012/0314329 A1    Dec. 13, 2012

(30) Foreign Application Priority Data

Jun. 8, 2011    (FR) .................................. 11 55017

(51) Int. Cl.
*H02H 3/00*      (2006.01)

(52) U.S. Cl.
USPC .............................................. 361/62; 361/42

(58) Field of Classification Search
USPC ............................................... 361/42, 62–69
See application file for complete search history.

(56) References Cited

U.S. PATENT DOCUMENTS

| | | | |
|---|---|---|---|
| 4,321,643 A * | 3/1982 | Vernier | 361/48 |
| 7,103,486 B2 * | 9/2006 | Tian | 702/64 |
| 8,320,089 B1 * | 11/2012 | Chelcun et al. | 361/42 |
| 2007/0201170 A1 * | 8/2007 | Hooper | 361/42 |
| 2010/0118452 A1 * | 5/2010 | Hull, Jr. | 361/49 |

* cited by examiner

*Primary Examiner* — Danny Nguyen
(74) *Attorney, Agent, or Firm* — Meyertons, Hood, Kivlin, Kowert & Goetzel, P.C.; Eric B. Meyertons

(57) ABSTRACT

System of current protection of a primary electrical distribution box supplied by at least one electrical energy generator and delivering electrical energy to at least one load and/or to at least one secondary distribution box, comprising a line contactor for each generator arranged between the primary electrical distribution box and said generator, the primary electrical distribution box comprising an electrically conductive frame. The system of protection comprises an electrical connection member capable of electrically coupling the frame of the box to an external metal structure coupled to the earth, a current sensor capable of measuring a current flowing through said electrical connection member, and control means capable of controlling the line contactors so as to electrically decouple at least one generator from the primary electrical distribution box if a current flowing through said electrical connection member is detected.

8 Claims, 3 Drawing Sheets

SYSTEM OF CURRENT PROTECTION OF A PRIMARY ELECTRICAL DISTRIBUTION BOX

BACKGROUND OF THE INVENTION

1. Field of the Invention

The invention relates to the current protection of a distribution box, and more particularly the current protection of a primary electrical distribution box supplied by a generator and delivering electrical energy to at least one secondary distribution box.

2. Description of the Relevant Art

The distribution of electrical energy in an aircraft is generally arranged in a pyramidal hierarchy. First of all, the electrical power is produced mainly from engine-driven generators. This energy is then conveyed by means of cables to primary distribution boxes. These primary distribution boxes then send this electrical energy directly to loads or to secondary distribution boxes.

In general, each of the primary or secondary boxes include the distribution components among which some, like the line contactor, have the function of switching this electrical energy to a distribution busbar included in the distribution box, a primary distribution busbar in a primary box and a secondary distribution busbar in a secondary box. They also include distribution components which have the function of switching electrical power to electrical loads on board, or even distribution components having the function of switching electrical energy to secondary distribution subnetworks that further redistribute the electrical energy to loads of lesser power.

Other distribution components have the function of protecting the network in case of a fault, such as a short-circuit, for example.

Systematically, each cable coming out of the distribution box for routing electrical energy is protected by a protection component such as, for example, a circuit breaker, a fuse, or a contactor breaker. These components are all based on a trip from a current overload, and are therefore activated according to a trip time inversely proportional to the overload current.

The trip time of these protections is defined so that in case of a fault, the protection element situated directly upstream cuts out on its own without any other protection component tripping.

Otherwise, where a protection element of higher rank, i.e. farther upstream, trips, the faulty line would be isolated, as well as other healthy lines causing problems. This is the principle of selectivity. Thus, the protections of the secondary network trip faster than those farther upstream, of the primary network.

The protection farthest upstream of the electricity network is that which controls the generator and which controls the line contactor, the switching element farthest upstream. It is also based on a current measurement in order to identify an overload. It can be used to isolate the fault if no other downstream protection could do so, thus proving that the fault is situated downstream at the level of the primary network. For this last protection to trip, it must, however, wait for enough time for all downstream protections to be able to trip if the fault is situated at their level. This time can take up to 5 s, which is long enough to cause significant damage.

By creating a hierarchical protection such as that above, the generator protection can operate only after all the others, and is therefore the longest to trip. Consequently, a fault directly downstream of the generator protection, but upstream of all the other protections, may cause damage before being isolated given the trip time of this last generator protection. This damage may then be harmful to the operation of the electrical distribution system but especially to the continued mission of the aircraft.

Other types of protection are also known for obviating the need for this hierarchical principle, this is differential protection. This protection consists in making a measurement upstream and a measurement downstream of a distribution line. In the absence of a fault, the current measured upstream and downstream of the distribution line by the two sensors is identical. On the other hand, in case of a fault, the current measured by the two sensors differs since a part of the current is then directed to the structure at the location of the short circuit. This principle is generally used for protecting generator cables. This principle of protection is also sometimes used for cable protections called inter-busbar protections between two primary busbars of the same primary box or in two primary distribution boxes.

This protection is, on the other hand, very difficult to implement for protecting a distribution box from an internal short circuit since a current comparison then has to be made between a supply line, that coming from the generator, and several distribution lines for the supply of loads and of the secondary network. Given the number of lines to be measured and the disparity, however small, of the sensors used, there is a high risk of nuisance tripping of the protection element.

SUMMARY OF THE INVENTION

The invention is aimed at solving the aforementioned problems by providing a system of current protection adapted for quickly protecting a primary distribution box from an internal short circuit.

According to one aspect, in one embodiment, a system of current protection of a primary electrical distribution box is provided supplied by at least one electrical energy generator and delivering electrical energy to at least one load and/or to at least one secondary distribution box, comprising a line contactor for each generator arranged between the primary electrical distribution box and said generator, and the primary electrical distribution box comprising an electrically conductive frame.

According to a general feature, the system of protection comprises an electrical connection member capable of electrically coupling the frame of the box to an external metal structure coupled to the earth, a current sensor capable of measuring a current flowing through said electrical connection member, and control means capable of controlling the line contactors so as to electrically decouple at least one generator from the primary electrical distribution box if a current flowing through said electrical connection member is detected.

Thus, in the case where a single generator supplies the primary electrical distribution box, upon the appearance of a leakage current on the electrical connection member, the generator is electrically decoupled from the primary electrical distribution box via a line contactor control coupling the generator to the primary electrical distribution box.

In the case where several generators supply the primary electrical distribution box, it is possible to simultaneously electrically decouple all the generators from the primary electrical distribution box by controlling the line contactors coupling the generators to the primary electrical distribution box as soon as a current is detected on the electrical connection member, and thus to protect the integrity of the primary electrical distribution box.

Advantageously, the system may also comprise a plurality of current measuring modules, a current measuring module being coupled to a generator, a plurality of generator overload determining means coupled at the output to the control means, a generator overload determining means being coupled at the input to a current measuring module and capable of comparing a current measurement to an overload current threshold, and in which the control means are capable of controlling the line contactors so as to electrically decouple the generators in overload from the primary electrical distribution box.

In this way, by coupling the detection of a current on the electrical connection member to the detection of the overload of one or more generators, the system of protection is able to electrically decouple the generators in overload which accordingly supply the fault, and thus to quickly isolate the faulty lines while maintaining a supply to the primary electrical box by the other generators which are not in overload.

Advantageously, the device may comprise means of electrical isolation included between the primary electrical distribution box and the external metal structure.

According to another aspect in one mode of implementation, a method is provided of current protection of a primary electrical distribution box supplied by at least one electrical energy generator and delivering electrical energy to at least one load and/or to at least one secondary distribution box, the primary electrical distribution box comprising an electrically conductive frame.

According to a general feature, the method comprises an electrical coupling from the electrically conductive chassis of the box to an external metal structure coupled to the earth via an electrical connecting member, a measurement of the current flowing through said electrical connection member, and a control for electrically decoupling at least one generator from the primary electrical distribution box if a current flowing through said electrical connecting member is detected.

Advantageously, the method may also comprise a current measurement of each generator, a comparison of each measurement to a current overload threshold, a determination of generators in overload, and a control for electrically decoupling the generators in overload from the primary electrical distribution box.

The primary electrical distribution box may advantageously be attached to the external metal structure so as to be electrically isolated.

BRIEF DESCRIPTION OF THE DRAWINGS

Other advantages and features of the invention will appear on examining the description of a detailed embodiment and a mode of implementation of the invention that are in no way restrictive, and the accompanying drawings, in which.

Figure 1:
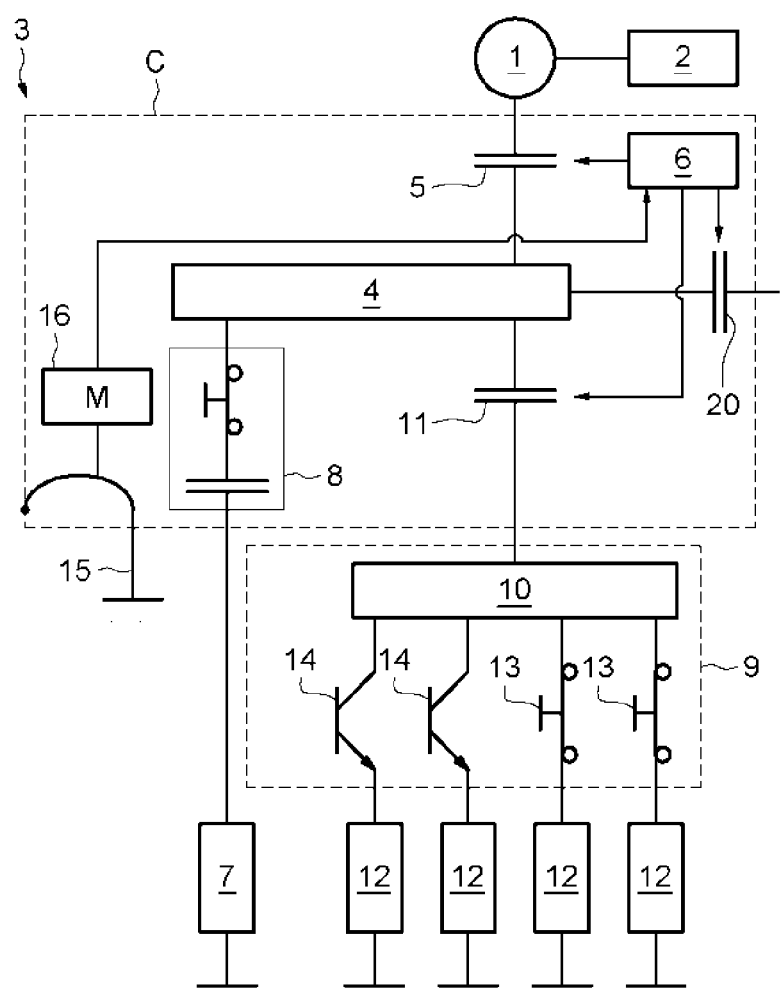
FIG. 1 illustrates, schematically, an electrical distribution system comprising a system of current protection of a primary electrical distribution box according to a first embodiment.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

An electrical energy distribution network has been shown in FIG. 1 comprising a system of current protection of a primary electrical distribution box according to a first embodiment.

The distribution network comprises a generating stage, a primary network, a secondary network, and a stage of electrical loads to be supplied in electrical energy.

The generating stage comprises an electrical energy generator 1 coupled to control means 2 of the generator 1.

The primary network comprises a primary electrical distribution box 3 including a primary distribution busbar 4 for receiving the electrical energy delivered by the generator 1 and switching this electrical energy to the secondary network or directly to the stage of electrical loads. The primary distribution busbar 4 is coupled to the generator 1 via a line contactor 5 coupled to control means 6 of the contactors for controlling the opening or closing of the line contactor 5 and thus supplying or not supplying the primary distribution busbar 4.

The primary distribution busbar 4 supplies a load 7 downstream coupled to the primary distribution busbar 4 via a contactor breaker 8 tripping if a current overload appears on the load 7.

The primary distribution busbar 4 also switches the electrical energy delivered by the generator 1 to a secondary electrical distribution box 9. The secondary electrical distribution box 9 comprises a secondary distribution busbar 10 coupled to the primary distribution busbar 4 via a contactor 11 also coupled to the control means 6 of the contactors.

The secondary distribution busbar 10 switches the electrical energy to loads 12 via cable protection components, such as circuit breakers 13 or fuses 14. The cable protection components 13 and/or 14 trip if an overload appears on the load 12 to which the protection element is coupled.

The primary distribution busbar 4 can also switch the electrical energy delivered by the generator 1 to another adjacent primary distribution busbar situated in the same primary distribution box 3 or in another primary distribution box via a bus tie contactor 20.

In normal operation, this adjacent primary distribution busbar is supplied by a supplementary generator. However, if the generator 1 that supplies the primary distribution busbar 4 is faulty or if the supplementary generator supplying the adjacent distribution busbar is faulty, then the bus tie contactor 20 is closed thereby enabling the two primary distribution busbars to be supplied by the generator remaining in operation. In this mode of operation, the bus tie contactor 20 can be linked to a line contactor as it switches the current supply of the supplementary generator onto the primary distribution busbar 4 if the generator 1 is faulty.

The frame C of the primary electrical distribution box 3 is coupled to the earth via an electrical connection member 15 such as a cable or a metal braid. In the case where the primary electrical distribution box 3 is on board an aircraft for example, the frame of the primary electrical distribution box 3 may be electrically connected to the aircraft structure via one or more cables or bonding braids.

The primary electrical distribution box 3 comprises a current sensor 16 coupled to the electrical connection member 15 on the one hand, and coupled to the control means 6 of the contactors on the other. The current sensor 16 is used to detect the appearance of a current flowing through the electrical connection member 15.

In normal operation, there is no current circulating in the electrical connection member 15. However, upon the appearance of an electrical fault or an electric arc between an electrically conductive element inside the primary electrical distribution box 3 and the frame C, a current circulates in the frame C and flows through the electrical connection member 15. This current is then detected by the current sensor and a detection signal is sent to the control means 6 of the contactors which control the opening of the line contactor 5 thus decoupling the generator 1 from the primary distribution busbar 4 of the primary electrical distribution box 3. The components of the primary electrical distribution box 3 and the generator 1 are then protected.

Figure 2:
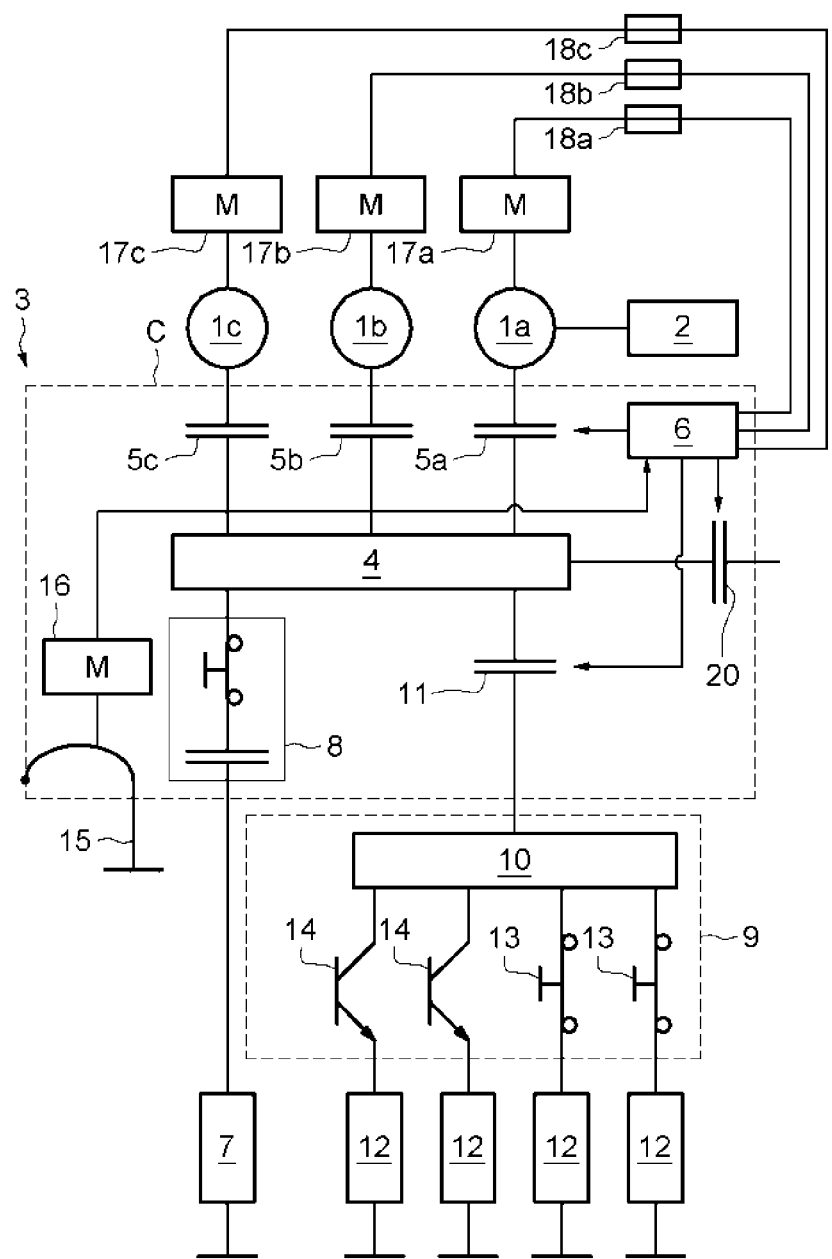
FIG. 2 illustrates, schematically, an electrical distribution system comprising a system of current protection of a primary electrical distribution box according to a second embodiment.

An electrical energy distribution network has been shown in FIG. 2 comprising a system of current protection of a primary electrical distribution box according to a second embodiment. The elements identical to the elements described in FIG. 1 bear the same references.

In this embodiment, the generating stage of the distribution network comprises three generators 1a, 1b and 1c coupled to the control means 2 of the generators. The three generators 1a, 1b and 1c are coupled to the primary distribution busbar 4 respectively via three contactors 5a, 5b and 5c. The three line contactors 5a, 5b and 5c are controlled by the control means 6 of the contactors.

Current measuring means 17a, 17b and 17c are respectively coupled to the three generators 1a, 1b and 1c so as to measure at any time the current delivered by each generator 1a, 1b and 1c. Each measurement made by one of the current measuring means 17a, 17b and 17c is respectively transmitted to a comparator 18a, 18b and 18c which compares the measurement performed to an overload threshold and which thus detects if a generator 1a, 1b or 1c is in overload.

In fact, if an electrical fault or an electric arc appears between an electrically conductive element inside the primary electrical distribution box 3 and the frame C, in addition to the electric current circulating in the frame C and flowing through the electrical connection member 15, at least one generator 1a, 1b and/or 1c is in overload. The overload of a generator is measured by the associated current sensor 17a, 17b or 17c, and determined by the respectively associated comparators 18a, 18b and 18c, and transmitted to the control means 6 of the contactors.

In this embodiment, if a current is detected in the electrical connection member 15 by the current sensor 16, the control means 6 of the contactors control the opening of the contactor(s) 5a, 5b and/or 5c coupled to the generator(s) in overload.

Figure 3:
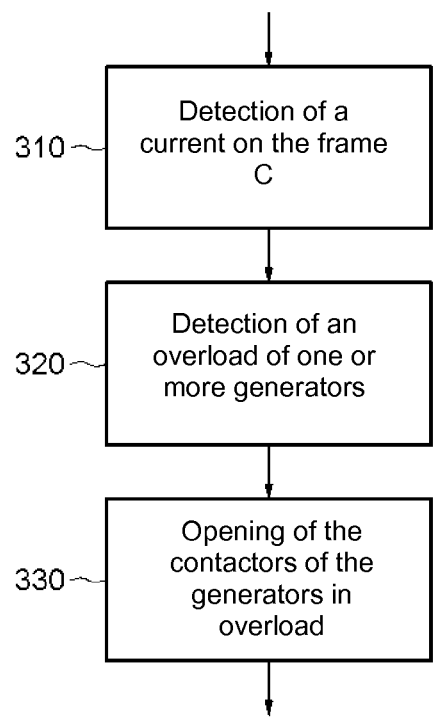
FIG. 3 shows a flow chart of a method of current protection of a primary electrical distribution box according to a mode of implementation.

FIG. 3 schematically illustrates a flow chart of a method of current protection of a primary electrical distribution box 3 according to a mode of implementation relating to the second embodiment shown in FIG. 2.

In a first step, with the aid of the current sensor 16 it is detected whether a current flows through the electrical connection member 15. This current means that a current is circulating in the frame C. This current is due to the appearance of an electrical fault or an electric arc between an electrically conductive element inside the primary electrical distribution box 3 and the frame C.

In a second step 320, with the aid of the current sensors 17a, 17b and 17c respectively coupled to the three generators 1a, 1b and 1c and comparators 18a, 18b and 18c, it is detected whether at least one of the three generators 1a, 1b and/or 1c is in overload.

In a third step 330, the control means 6 of the contactors control the opening of the contactors 5a, 5b and/or 5c which are coupled to generators in overload.

The proposed invention can be used to simply and quickly protect a primary electrical distribution box supplied by one or more generators, by directly detecting an electrical fault or an electric arc between an element inside the primary electrical distribution box and the frame, without waiting for the downstream protections to be tested.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. System of current protection of a primary electrical distribution box supplied by at least one electrical energy generator and delivering electrical energy to at least one load and/or to at least one secondary distribution box, comprising:
   a line contactor for each generator arranged between the primary electrical distribution box and said generator, the primary electrical distribution box comprising an electrically conductive frame;
   an electrical connection member capable of electrically coupling the frame of the primary electrical distribution box to an external metal structure coupled to the earth,
   a current sensor capable of measuring a current flowing through said electrical connection member, and
   control means capable of controlling the line contactors so as to electrically decouple at least one generator from the primary electrical distribution box if a current flowing through said electrical connection member is detected.

2. System according to claim 1, further comprising:
   a plurality of current measuring modules coupled to a plurality of generators,
   a plurality of generator overload determining means coupled at the output to the control means, wherein a generator overload determining means is coupled at the input to a current measuring module and capable of comparing a current measurement to an overload current threshold, and wherein control means is capable of controlling the line contactors so as to electrically decouple the generators in overload from the primary electrical distribution box.

3. System according to claim 1, further comprising means of electrical isolation included between the primary electrical distribution box and the external metal structure.

4. Method of current protection of a primary electrical distribution box supplied by at least one electrical energy generator and delivering electrical energy to at least one load and/or to at least one secondary distribution box, the primary electrical distribution box comprising an electrically conductive frame, wherein the electrically conductive frame of the box is coupled to an external metal structure coupled to ground via an electrical connection member, the method comprising:

measuring the current flowing through said electrical connection member, and electrically decoupling at least one generator from the primary electrical distribution box if a current flowing through said electrical connection member is detected.

5. Method according to claim 4, further comprising:
measuring a current of each generator;
comparing each measurement to an overload current threshold;
determining if each generator is in overload, and
electrically decoupling the generators in overload from the primary electrical distribution box.

6. Method according to claim 4, in which the primary electrical distribution box is attached to the external metal structure so as to be electrically isolated.

7. Method according to claim 5, in which the primary electrical distribution box is attached to the external metal structure so as to be electrically isolated.

8. System according to claim 2, further comprising means of electrical isolation included between the primary electrical distribution box and the external metal structure.

* * * * *